(12) United States Patent
Beziot et al.

(10) Patent No.: US 8,509,157 B2
(45) Date of Patent: Aug. 13, 2013

(54) METHOD FOR MANAGING RADIO RESOURCES IN AN UTRAN RADIO ACCESS NETWORK

(75) Inventors: Nathalie Beziot, Le Plessis Robinson (FR); Borja Jimenez Aldama, Paris (FR)

(73) Assignee: France Telecom, Paris (FR)

( * ) Notice: Subject to any disclaimer, the term of this patent is extended or adjusted under 35 U.S.C. 154(b) by 800 days.

(21) Appl. No.: 10/597,500

(22) PCT Filed: Jan. 20, 2005

(86) PCT No.: PCT/FR2005/000130
§ 371 (c)(1),
(2), (4) Date: Jul. 22, 2008

(87) PCT Pub. No.: WO2005/084061
PCT Pub. Date: Sep. 9, 2005

(65) Prior Publication Data
US 2008/0279139 A1    Nov. 13, 2008

(30) Foreign Application Priority Data
Jan. 28, 2004  (FR) ..................................... 04 00807

(51) Int. Cl.
*H04W 4/00*    (2009.01)

(52) U.S. Cl.
USPC ... 370/329; 370/310.2; 370/326; 370/395.21; 370/395.4; 370/395.41; 370/395.42; 370/395.43; 455/450; 455/451; 455/452.1; 455/452.2; 455/453; 455/432.1; 455/435.1; 455/435.2; 455/435.3; 455/434

(58) Field of Classification Search
USPC ................... 450/450–453, 432.1, 435.1, 0.2, 450/0.3, 434; 370/310.2, 328, 395.2–0.43, 370/329
See application file for complete search history.

(56) References Cited

U.S. PATENT DOCUMENTS

| | | | | |
|---|---|---|---|---|
| 6,016,311 A * | 1/2000 | Gilbert et al. | ................. | 370/280 |
| 6,668,175 B1 * | 12/2003 | Almgren et al. | .............. | 455/522 |
| 6,985,739 B2 * | 1/2006 | Spaling et al. | ................ | 455/453 |
| 7,023,825 B1 * | 4/2006 | Haumont et al. | ............. | 370/338 |
| 2003/0099196 A1 * | 5/2003 | Sebire | ........................... | 370/230 |

FOREIGN PATENT DOCUMENTS

WO    WO 02/03622    *    1/2010

OTHER PUBLICATIONS

International Search Report (PCT/FR2005/000130).
$3_{rd}$ Generation Partnership Project; Technical Specification Group Radio Access Network; UTRAN Lu interface RANAP signaling, Release 5, 3GPP TS 25.413, V5.5.0, (Jun. 2003).
D. Soldani et al. "A Virtual Time Simulator for Studying QoS Management Functions in UTRAN", Vehicular Technology Conference, vol. 5, pp. 3453-3457, Oct. 6-9, 2003.

* cited by examiner

*Primary Examiner* — Steve D Agosta
(74) *Attorney, Agent, or Firm* — Cozen O'Connor (57) ABSTRACT

A method for managing radio resources allocated by a radio network controller of a UTRAN radio access network, where the resources support a plurality of service requests identified by a radio access bearer service request sent by the core network and describing the required QoS as a set of RAB parameters defined by mapping with corresponding QoS parameters of the core network, the controller is provided to distribute the resources amongst the bearer services and to modulate the allocation of the resources according to the priority level associated with each of the bearer services, and the priority level is defined by the "priority level" sub-parameter of the "Allocation Retention Priority" RAB parameter, with a value determined by taking into account the value of the "Allocation Retention Priority" QOS parameter of the core network and the value of at least one QoS parameter associated with the type of service.

12 Claims, 3 Drawing Sheets

METHOD FOR MANAGING RADIO RESOURCES IN AN UTRAN RADIO ACCESS NETWORK

CROSS-REFERENCE TO RELATED APPLICATIONS

This is a U.S. national stage under 35 U.S.C. §371 of International Application No. PCT/FR2005/000130 filed 20 Jan. 2005. Priority is claimed on French Application No. 0400807 filed 28 Jan. 2004, the content of which is incorporated herein by reference in its entirety.

BACKGROUND OF THE INVENTION

1. Field of the Invention

This invention relates in general to the field of telecommunications and, more particularly, to a method for managing radio resources at the access network level in a UMTS mobile communication network in packet mode and in circuit mode.

Thus, the method according to the invention is intended for application to mobile networks using the UMTS technology, standardised within the framework of the 3GPP standard. For the sake of not overloading the description, a glossary comprising definitions for all of the acronyms used is provided at the end of the description, to which the reader may usefully refer.

2. Description of the Related Art

The UMTS standard specifies a new mobile access network: UTRAN, which makes it possible to offer subscribers of a mobile operator access to IP-based services (electronic messaging, downloading of files, web or WAP site consultation) or circuit services (telephony, video-telephony). At the present time, UMTS is being phased-in, in various versions also referred to as "releases," according to the English terminology, and in particular the version called Release 99, to which the following description refers more particularly.

Figure 1:
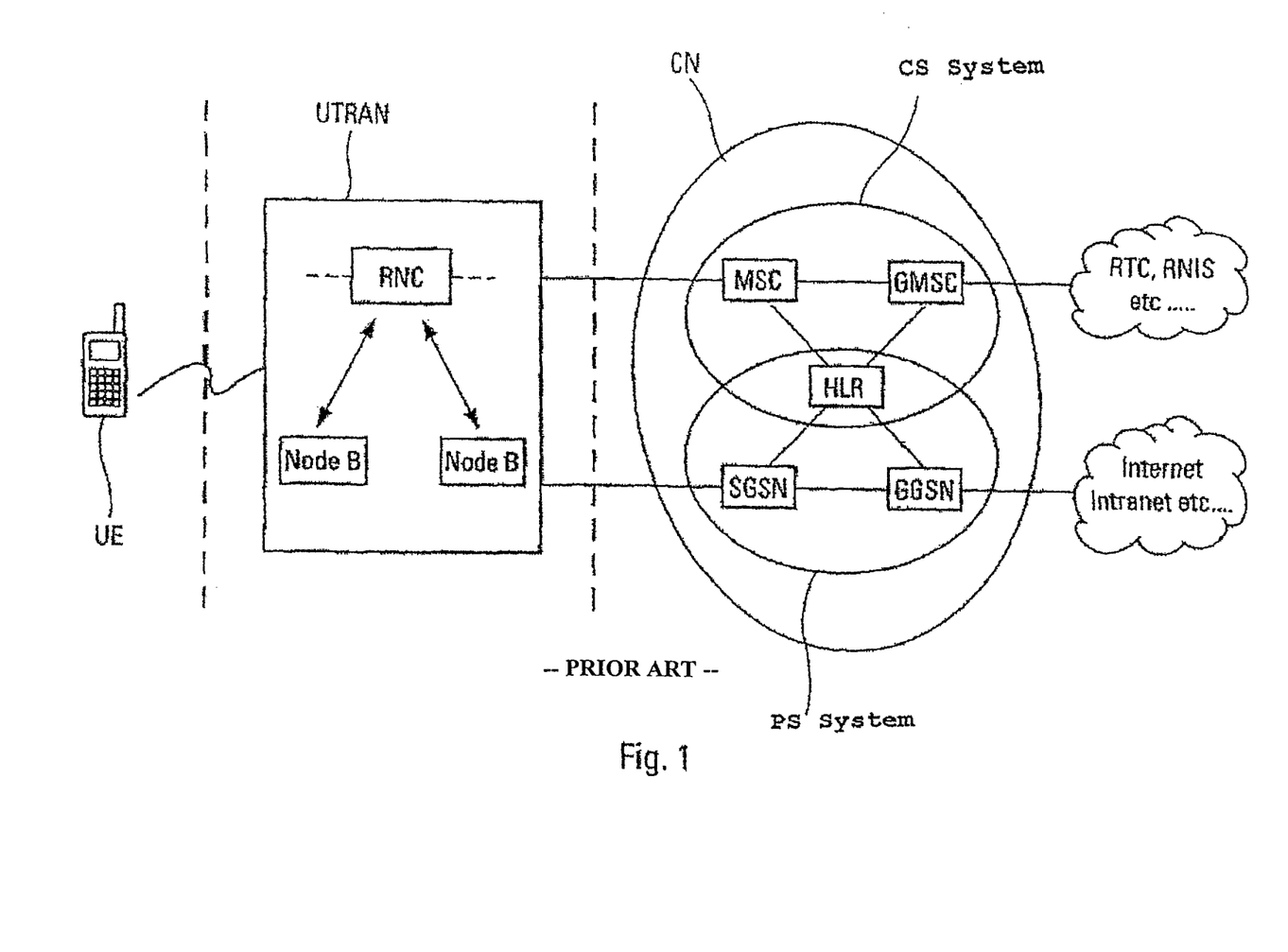
FIG. 1 describes the architecture of a UMTS network and has already been described.

Architecturally speaking, the UMTS network can be divided into two sub-networks the core network CN and the radio access network, also called UTRAN, as shown in FIG. 1.

The access network includes a plurality of Node-B radio base stations, provided for communicating with user equipment UE through a radio interface using radio resources allocated by an RNC controller. The hierarchical architecture in which one entity controls several lower-level entities is identical to the GSM radio access network. The RNC radio network controller therein holds the position of the GSM base station controller (BSC). However, the radio technologies used for transporting information are different.

As concerns the UMTS core network CN, it includes two separate systems: the circuit system Cs, which includes all of the services associated with telephony, and the packet system PS, which includes all of the services associated with packet switching.

At the core network level is found the HLR, which is a database common to both systems, wherein is stored the information relating to each subscriber of the network's operator: the subscriber's telephone number, the mobile identity as well as the subscription information. The HLR also contains, among other things, the quality of service information associated with the subscribers and services, which will be defined further on in the description. Thus, it is from this database that the mobile subscribers within the network are managed.

The core network also hosts the MSC circuit switches and the SGSN packet switches. These service nodes of the core network manage the communication link with the access network. They store the subscriber profile coming from the HLK and monitor the network resources requested by the subscriber.

At the packet system level, the SGSN is associated with another service node, the GGSN, which acts more particularly as a gateway to the outside packet-switching networks (Internet, etc. . . . ). As concerns the packet system, the UMTS core network is thus interconnected with the outside via a gateway, the GGSN service node, which contains the routing information enabling the mobile telephone to communicate with an external network, particularly the Internet network, while at the same time ensuring security. In order to be able to send information to the mobile telephone, the GGSN then uses the other service node, the SGSN, which manages mobility at the core network level, authentication and encryption. These network elements integrate IP router functions and constitute an IP-type network.

At the circuit system level, and in the same way as explained in relation to the packet system, the MSC is associated with another service node, the GMSC, serving as a gateway to the stationary networks of the RNC type, RNIS type, etc.

In Release 99, all of the UMTS services are supported by four standardised classes of traffic as follows: "Conversational", "Streaming", "Interactive" and "Background".

The "Conversational" and "Streaming" classes are provided primarily for transporting real-time streams such as voice or video. However, for the "Streaming" class, corresponding to a use of the type where a user is looking at (or listening to) a real-time video (or audio) stream, the data transfer time restraints are fewer than for the "Conversational" class.

The "Interactive" and "Background" classes correspond to non-real-time services and are themselves provided to be used within the framework of traditional Internet applications such as navigation, electronic mail, and FTP applications. Being non-real-time, these latter classes offer a much better error rate thanks to retransmission and encoding methods.

SUMMARY OF THE INVENTION

The invention thus relates to managing the distribution of resources, and more particularly radio resource, within the access network. A management operation such as this requires consideration of the quality of service (Qos) parameters associated with a service request.

The QoS parameters of the UMTS bearer service thus describe the service rendered by the UMTS network to the user of the bearer service. The QoS profile, consisting of the entire set of QoS parameters, specifies this service. Thus, these are standardised parameters making it possible to define the principal characteristics of a data stream on the network, particularly in terms of throughput, type of traffic, priority, etc. This data is stored in the subscriber profile in the HLR and transmitted, by means of various procedures, to the following entities: SGSN and MSC.

The QOS profile of a subscriber in the packet system actually corresponds to the authorised upper limit in relation to the specific values requested by the subscriber. The QoS profile can also correspond to a default profile configured by the operator.

Primary among these QOS parameters specified in a QoS profile are the following:

"Allocation Retention Priority" (ARP): this QoS makes it possible to prioritise the traffic between several subscribers for the allocation and retention of the UMTS bearer services. A parameter of this type is specified respectively for each system: the packet system and the circuit system.

"Traffic Class": this QoS parameter indicates the priority associated with the type of service. As seen, in Release 99, all of the services are supported by four traffic classes. Consequently, this QoS parameter can assume the values of "Conversational" (corresponding to a high-priority level, since the real time requirement is very important), "Streaming," "Interactive" and "Background" (low priority).

"Traffic Handling Priority" (THP): this QoS parameter makes it possible to specify the level of priority for the "Interactive" traffic class. This parameter can assume three values and thereby makes it possible to prioritise the "interactive" type profiles in relation to one another.

Among these parameters, the following may also be cited, but for informational purposes, since they are not used within the framework of this invention:

"Transfer Delay": this QoS parameter provides the maximum delay during transfer of a packet. It is used for real-time services only.

"Guaranteed bit rate": this QoS parameter indicates the guaranteed throughput during transfer of a packet. It is used for real-time services only "Maximum bit rate": this QoS parameter indicates the maximum throughput.

All of the aforesaid QoS parameters are defined within the framework of the 3GPP Telecommunications Standard. However, their use is not standardised.

In UMTS Release 99, at the HLR level, the standard anticipates the possibility of having a level of priority in the subscriber data for packet and circuit services. The "Allocation Retention Priority" (ARP) parameter is used for this purpose. This parameter is informed at the HLR level in the core network for each subscribed PDP context, for the packet system, or per subscriber for the circuit system.

The ARP parameter thus makes it possible to define a priority amongst the subscribers for the allocation/retention of the radio resources. The ARP parameter is used in the MSC, SGSN, GGSN, and can assume three values in the core network: priority 1, priority 2 and priority 3, respectively, priority 3 being the lowest one.

The ARP parameter is sent to the RNC of the UTRAN in the form of four sub-parameters, in order to associate a level of priority with a communication corresponding to a service request from a subscriber. This parameter is then transformed into four sub-parameters at the core network level in order to be sent to the RNC of the UTRAN: "Priority Level", "Pre-emption Capability", "Pre-emption Vulnerability" and "Queuing Allowed", whose values derive from the ARP parameter of the core network. These four sub-parameters are defined more precisely in Part TS 25.413 of the 3GPP Standard.

Using the priority parameters sent by the core network CN, the UTRAN must be capable of distributing all of its resources (i.e., the radio resources, the transport resources and the processing capacity) between the various users of the system.

Figure 2:
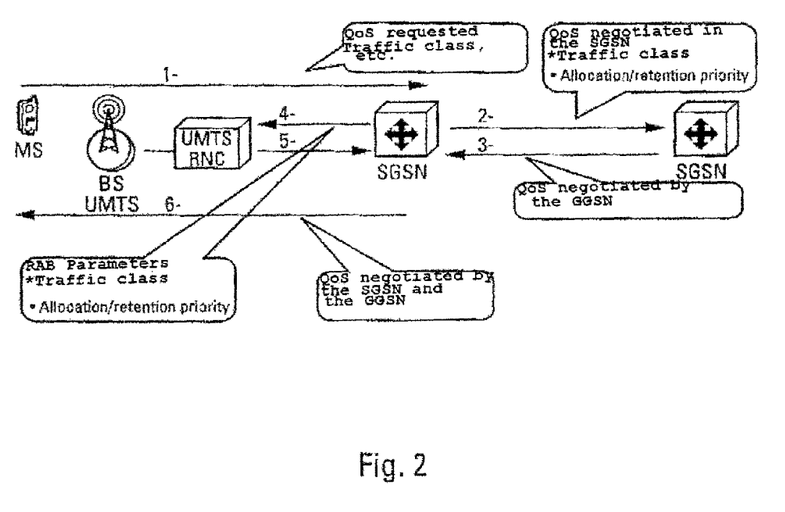
FIG. 2 describes the procedure for activating a PDP context for the packet system and has already been described.

An activation procedure for a PDP context is described in reference to FIG. 2. It enables a mobile MS terminal to request that a PDP context be stored in the SGSN and GGSN and also to reserve resources in the core network for executing the service desired by the subscriber. During activation of a PDP context, the various nodes of the UMTS network receive the quality of service information associated with the requested PDP context and with the subscriber's subscription, in particular the traffic class and the priority of the subscriber, as defined by the ARP parameter.

The information corresponding to the priority of the subscriber, i.e., the ARP parameter contained in the data defining the PDP contexts to which the subscriber subscribes, is transmitted to the SGSN when the subscriber is localised. This information is then transmitted to the GGSN when a PDP context is activated by the subscriber, and then to the RNC in the form of the four sub-parameters defined above.

The procedure for activating a PDP context thus takes place when the subscriber wishes to send or receive data on the network in order to execute a service to which they have subscribed, and is triggered at the initiative of the mobile subscriber, thereby enabling the terminal to be known by the GGSN service node, which performs the interconnection with the external network requested by the subscriber. Following this procedure for activating a PDP context, the corresponding quality of service profile is then exchanged between the various nodes of the network and the transmission of data between the UMTS network and the external network corresponding to the service requested by the subscriber can then begin.

In a first step, the mobile MS terminal requests the activation of a PDP context from its parent SGSN, by specifying the desired QoS. The SGSN may modify the requested QoS according to the subscription data and other parameters.

In the second and third steps, the SGSN relays the request to the GGSN along with the QoS parameters that it has modified. It is then a question of a negotiated QoS. The GGSN can then re-modify the QoS and send it back to the SGSN.

In steps 4 and 5, the SGSN requests that the RNC allocate the required radio resources by describing the negotiated QoS in the form of a request for radio access bearer service comprising a set of RAB parameters, which include, in particular, the traffic class and the four sub-parameters derived from the ARP parameter of the core network. The RAB parameters are defined in Section 9.2.1.3 of the 3GPP Standard TS 25.413 v4.0.0.

The RNC considers the request and, using the RAB parameters, makes a calculation of the radio resources required to support this service request. It verifies if the required resources are available and, if that is not the case, it must manage the shortage of resources based on the parameters of the services already being called for and the parameters of the new request. The RNC can then accept or refuse the requested radio access bearer service.

In a sixth step, the SGSN accepts the request from the mobile telephone by sending to it the quality of service that it obtained on the network.

At the circuit system level, let us take the example of an outgoing call request of the videophone type. In a first step, the mobile telephone sends its service request to the core network. The requested QoS characteristics are contained in the field relating the capacities of the bearer network (Bearer Capability). The latter specifies the throughput, desired type of connection . . . . In a second step, the request is relayed to the RNIS-type stationary network.

Finally, the core network sends its corresponding radio resource allocation request by describing the service request in the form of RAB parameters. The RNC performs a calculation of the resources required for supporting this service request. It verifies if these resources are available and, if that is not the case, it must manage the shortage of resources based on the parameters of services already being called for and the parameters of the new request. The RNC can then accept or reject the requested RAB.

One important constraint to be taken into account lies in the fact that the UTRAN must be capable of distributing all of its resources (radio resources, transport resources, processing capacity) amongst the various users of the system using the priority parameters sent by the CN. To accomplish that, a pre-emption procedure, provided for in the standard, can be implemented in order to facilitate access to the resources for users or services considered by the network operator as having priority, when the resources are not available for responding to the required QoS.

The priority parameters sent by the CN are part of the RAB parameters and are as follows:
Traffic Class
Traffic Handling Priority
Allocation Retention Priority, consisting of the four sub-parameters:
  Priority Level
  Pre-emption Capability
  Pre-emption Vulnerability
  Queuing Allowed.

These various parameters can make it possible to define a priority level for allocating the resources amongst the various radio access bearer services RAB corresponding to the service requests coming from the core network. Additionally, when the resources required for responding to a new service request are insufficient or are not available, the pre-emption procedure provided for in the standard may be implemented based on this priority level.

In practical terms, the pre-emption procedure involves the use of algorithms that make it possible to reduce the resources allocated to a given user so as to have sufficient resources to respond to a priority request.

Figure 3:
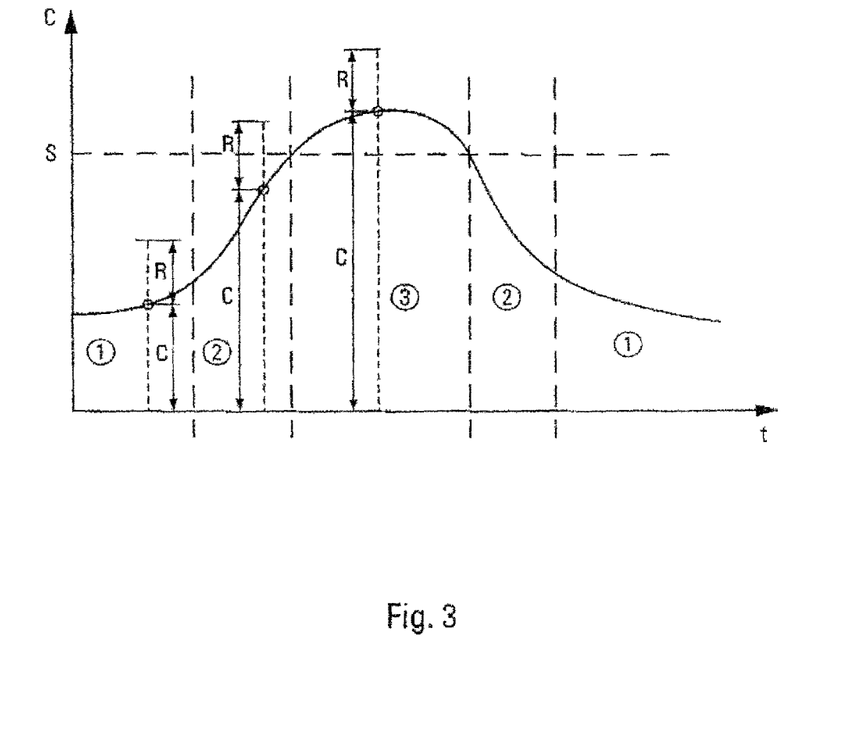
FIG. 3 is a schematic illustration of the various levels of use of the resources in the UTRAN and has also already been described.

In this respect, the diagram of FIG. 3 shows the various levels of use of the UTRAN resources C, which correspond to the various load scenarios of the network over the course of time t. These various scenarios make it possible to define the use cases for the pre-emption procedure. The threshold S delimits the area considered as an overload area. It is to be pointed out that, for certain types of resources, it may never be possible to exceed this threshold (physically, all of the resources are utilised, in which case, reference is made to countable resources). Conversely, for other types of resources, uncountable resources, the overload threshold S may be exceeded over a certain period of time.

In an area 1, also referred to as a normal area, no restriction exists as concerns the use of resources. As a matter of fact, there are sufficient available resources to respond to a new request for allocation of resources, and the pre-emption procedure need not be utilised. In other words, the sum of the resources C currently used on the network and the resources required R to satisfy the new request for allocation of resources, with the required quality of service, is less than the value of the threshold S, which delimits the overload area. Thus, this verifies: $C+R<S$.

In an area 2, said area close to the overload, there are still available resources, but these available resources are insufficient to respond to a new resource allocation request. That it to say, the use level of the resources C in the network is lower than the threshold S, which delimits the overload area, but if, as part of all of the resources used, the resources required R to satisfy the new resource allocation request are also considered together with the required quality of service, one passes into an area referenced as 3, also known as an overload area. Thus: $C+R>S$ and $C<S$.

In a situation such as this, several strategies may be anticipated for responding to the new request for allocation of resources on the network:

either the request is plainly and simply refused,
or the request is accepted, but with a quantity of resources allocated that is lower than that requested, so as not to enter into the overload area,
or the request is accepted along with its requested quality of service, and the pre-emption procedure is triggered in order to recover the resources required for fully responding to the request.

In the overload area 3, the level of use of the resources is equal to or greater than the threshold that delimits the overload area. In this situation, the following relationship is verified: $C \geq S$.

In other words, in this area, the actual load in the network, which corresponds to the level of resources used at that moment, is greater than or equal to the threshold value that delimits the overload area. The network is then overloaded or saturated. In this area 3, any new request for allocation of resources, either following the establishment of a new RAB, or following a request for reconfiguration of an RAB in order to respond to a change in the traffic of this particular RAB already accepted into the network or to a mobility of this RAB, is rejected until the load level drops below the overload threshold.

In this way, it is recognised that, under certain circumstances, the prevailing level of use of the UTRAN resources renders problematic the response to a new resource allocation request together with the quality of service required. The triggering of a pre-emption procedure aiming precisely to recover the resources required for responding to the new request along with the required quality of service is thus indispensable to facilitating access to the resources, for users considered by the operator as having priority.

Such being the case, the references to procedures for pre-empting resources in the UTRAN that are present in the 3GPP Standard are extremely succinct and basically provide a simple definition of the rule according to which the UTRAN alone may implement mechanisms making it possible to pre-empt RABs with lower priority, in an ascending order of priority. However, the criteria for assigning a level of priority to an RAB in relation to another RAB are not described in the standard. The manner in which access to radio resources at the UTRAN level are prioritised, as well as the various cases of use of the pre-emption procedure, are therefore left open for implementation. That involves concepts that are very important to the UMTS operators, since they play a primary role in defining strategy for sharing and allocating the radio resources of the access network, for various classes of subscribers, for example.

Consequently, one purpose of this invention is to define a large number of different levels of priority within the UTRAN, amongst various RABs corresponding to service requests coming from the CN, making it possible to optimise the strategy for sharing and allocating the resources of the UMTS access network, by prioritising the radio resources amongst the services and subscribers at the radio access network level.

Another purpose of this invention is to define various cases of use of the procedure for pre-empting radio resources at the UMTS access network level, using the order of priority relationship that has been established.

Therefore, this invention relates to a method for managing radio resources in a UMTS type mobile communication network, said radio resources being allocated by a radio access controller of a radio access network of the UMTS network, in order to support a plurality of service requests sent by user equipment to a core network of the UMTS network, each service being specified by a set of quality of service parameters recorded within an entity of the core network, each of said service requests being processed by the core network sending to said radio network controller a corresponding request for allocation of radio resources, comprising a bearer service request for radio access describing the required quality of service in the form of a set of RAB parameters whose value is defined by mapping with the corresponding quality of service parameters of the core network, said radio network controller being provided for distributing the radio resources of the access network amongst the various radio access bearer services corresponding to the various service requests and for implementing a procedure to pre-empt said resources, aiming to modulate the allocation of the resources to said bearer services according to a priority level associated with each of them, so as to satisfy the quality of service required for the bearer services based on their priority level, said method being characterised in that said priority level is defined for each bearer service by the "priority level" subs parameter of the "Allocation Retention Priority" RAB parameter, whose value is determined by taking into account, on the one hand, the value of said "Allocation Retention Priority" quality of service parameter of the core network and, on the other hand, the value of at least one quality of service parameter associated with the type of service.

According to one embodiment of the invention, the quality of service parameters associated with the type of service used for determining the value assigned to the "Priority Level" sub-parameter defining the priority level for the corresponding bearer service, include the "Traffic Class" parameter.

According to another embodiment, the quality of service parameters associated with the type of service used for determining the value assigned to the "Priority Level" sub-parameter defining the priority level for the corresponding bearer service, further include the "Traffic Handling Priority" parameter, making it possible to prioritise the interactive-type services in relation to each other.

According to one characteristic, the procedure for pre-empting resources at the access network level is implemented when the radio network controller receives at least one new bearer service request for radio access, in the case where there are no more available radio resources, or if the radio resources required to satisfy the quality of service associated with said new request are insufficient.

According to another characteristic, the procedure for pre-empting resources at the access network level is implemented when the radio network controller receives at least one request for additional resources in order to respond to a change in the traffic on said network brought about by at least one bearer service already active within said network, when there are no more available radio resources, or if the radio resources required to satisfy the request for additional resources are insufficient.

Advantageously, in the case where at least two bearer services already active within the network are the subject, respectively, of a request for additional resources and where the resources required to satisfy said requests are available, a prioritisation step for the allocation of the resources is implemented so as to determine, based on the priority level associated with each of said bearer services, to which of said bearer services the additional resources will be assigned on a priority basis.

Advantageously, in the case where at least two radio access bearer services already active within the network do not utilise the resources that have allocated to them in an optimal manner, a prioritisation step is implemented amongst said bearer services, so as to reduce the resources allocated to said bearer services in an order defined by the priority level associated with each of said bearer services.

BRIEF DESCRIPTION OF THE DRAWINGS

The invention will be better understood and other details and advantages will become apparent upon reading the following description of one preferred exemplary embodiment, given for illustrative and non-limiting purposes only, the description making reference to the appended drawings in which.

DETAILED DESCRIPTION OF THE PREFERRED EMBODIMENTS

Thus, as previously explained, the UTRAN must be capable of distributing all of its resources amongst the various users of the system. In order to accomplish that, it is necessary to implement a pre-emption procedure at the UTRAN radio network controller level, aiming to facilitate access to the resources for the radio access bearer services or RABs, considered by the operator of the network as having priority.

To accomplish this, the invention proposes to define a large number of priority levels amongst the various RABs, used to prioritise access to the resources for the RABs in the UTRAN, and to be able to choose which RAB will pre-empt which other RAB for the allocation of the resources, when the latter are insufficient or unavailable.

These various priority level values are thus provided to be used by the resource management algorithms and, more particularly, by those that will call for a procedure for preempting the resources, in order to determine the allocation of the resources assigned to each RAB at the radio access network level, when several RABs are in competition to obtain the same resources. The priority level values according to the invention will be used by the pre-emption procedure when the resources required to satisfy the request from a given RAB are not available or else are insufficient in view of the prevailing load level in the access network. The pre-emption procedure is therefore provided for using these priority level values according to the invention, which are associated with each RAB, in order to determine if a requesting RAB has the right to pre-empt resources at the access network level and, in this case, which RAB(s) will have its (their) resources pre-empted.

According one important characteristic of the invention, the various priority levels associated with the various RABs for allocation of the radio resources at the access network level must be capable of being configured by the operator based on the RAB parameters sent to the RNC by the core network and, more particularly, by the SGSN and/or MSC service node of the core network. The various RAB parameters are, in fact, derived from mapping with the quality of service parameters coming from the core network to the access network.

Thus, amongst the RAB parameters, are the following parameters:

"Traffic Class";

"Traffic Handling Priority", the value of these RAB parameters being obtained, respectively, by direct mapping with the corresponding "Traffic Class" and "Traffic Handling Priority" QoS parameters sent by the core network and associated with the type of service, and an RAB parameter associated with a priority level of the subscriber;

"Allocation Retention Priority", consisting of the four following sub-parameters derived from the "Allocation Retention Priority" QoS parameter of the core network;
"Priority Level"
"Pre-emption Capability"
"Pre-emption Vulnerability"
"Queuing Allowed".

In fact, the invention anticipates a new mapping of the quality of service parameters of the core network towards the access network, with the result being that the determination of the four RAB sub-parameters that integrate the ARP parameter takes into account not only the value of the ARP parameter of the core network, but also the values of the QoS parameters associated with the type of service.

More precisely, the priority level according to the invention, for managing the allocation of resources, is defined for each RAB by the "Priority Level" parameter of the "Allocation Retention Priority" RAB parameter whose value is determined by taking into account, on the one hand, the value of the "Allocation Retention Priority" parameter of the core network and, on the other hand, the value of at least one QoS parameter associated with the type of service. The QoS parameters associated with the type of service, used for determining the value assigned to the "Priority Level" sub-parameter for defining the priority level according to the invention, include, in a first embodiment, the "Traffic Class" parameter, capable of assuming four values. In a second embodiment, the QoS parameters used, which are associated with the type of service, further include the "Traffic Handling Priority" parameter, capable of assuming three values and that make it possible to prioritise, or order by level of priority, the interactive-type services (i.e., those for which the "Traffic Class" parameter assumes the "Interactive" value).

In this way, by using the "Traffic Class" QoS parameter and the "Allocation Retention Priority" QoS parameter of the core network, it is possible to define up to twelve values for the "Priority Level" parameter, amongst the various RABs, and therefore up to twelve priority levels.

Furthermore, by using the "Traffic Class" parameter, the "Allocation Retention Priority" parameter of the core network and the "Traffic Handling Priority" parameter, it is possible to define up to eighteen values for the "Priority Level" parameter, amongst the various RABs, and therefore up to eighteen priority levels.

The table below illustrates a first definition example using the "Priority Level" parameter, of a priority level for the service/subscriber pair associated with each RAB, used for managing the allocation/retention of the resources within the access network:

| QoS Parameters of the Core Network | | RAB Parameters Allocation/Retention Priority | | | |
|---|---|---|---|---|---|
| Traffic Class | Allocation/ Retention Priority | Priority Level | Pre-emption Capability | Pre-emption Vulnerability | Queuing Allowed |
| Conversational | 1 | 1 | Y | N | N |
| Conversational | 2 | 2 | Y | Y | N |
| Conversational | 3 | 3 | Y | Y | N |
| Streaming | 1 | 4 | Y | Y | N |
| Streaming | 2 | 5 | Y | Y | N |
| Streaming | 3 | 6 | Y | Y | N |
| Interactive | 1 | 7 | Y | Y | N |
| Interactive | 2 | 8 | Y | Y | N |
| Interactive | 3 | 9 | Y | Y | N |
| Background | 1 | 10 | Y | Y | N |
| Background | 2 | 11 | Y | Y | N |
| Background | 3 | 12 | N | Y | N |

The value Y assigned to the "Preemption Capability" indicates that the associated RAB is capable of pre-empting the resources of other RABs, the value N indicating the reverse. In the same way, the value Y assigned to the "Pre-emption Vulnerability" parameter indicates that the associated RAB may have its resources pre-empted by other RABs, the value N indicating the reverse.

Derived from the example presented above is the following definition of an order of priority amongst the various RABs for the allocation/retention of resources using the "Priority Level" parameter, which is determined by taking into account for each RAB, on the one hand, the value of the "Allocation Retention Priority" parameter of the core network and, on the other hand, the value of the "Traffic Class" QoS parameter:

RAB with "Priority Level"1>RAB with "Priority Level"=2> . . . >RAB with "Priority Level"=11>RAB with "Priority Level"=12.

Thus, an RAB with a priority level defined according to the invention and equal to 5 can pre-empt the resources allocated to the RABs having a priority level according the invention that ranges from 6 to 12.

The table below illustrates a second definition example using the "Priority Level" parameter, of a priority level for a service/subscriber pair associated with each RAB, used for managing the allocation/retention of the resources in the access network, where the value of the "Priority Level" parameter for each RAB is this time determined by taking into account, in addition to the value of the "Allocation Retention Priority" parameter of the core network and the value of the "Traffic Class" QoS parameter, the value of the QoS parameter associated with the "Traffic Handling Priority" type of service. This example relates to a configuration of the network wherein the real-time services cannot have their resources pre-empted, as shown by the value N assigned to the "Pre-emption Vulnerability" sub-parameter for the services of this type ("Conversational" and "Streaming").

| QoS Parameters of the Core Network | | RAB Parameters Allocation/Retention Priority | | | | |
|---|---|---|---|---|---|---|
| Traffic Class | THP | Allocation/ Retention Priority | Priority Level | Pre-emption Capability | Pre-emption Vulnerability | Queuing Allowed |
| Conversational |   | 1  | 1  | Y | N | N |
| Conversational |   | 2  | 2  | Y | N | N |
| Conversational |   | 3  | 3  | Y | N | N |
| Streaming      |   | 1  | 4  | Y | N | N |
| Streaming      |   | 2  | 5  | Y | N | N |
| Streaming      |   | 3  | 6  | Y | N | N |
| Interactive    | 1 | 1  | 7  | Y | Y | N |
| Interactive    | 2 | 1  | 7  | Y | Y | N |
| Interactive    | 3 | 1  | 7  | Y | Y | N |
| Interactive    | 1 | 2  | 8  | Y | Y | N |
| Interactive    | 2 | 2  | 8  | Y | Y | N |
| Interactive    | 3 | 2  | 8  | Y | Y | N |
| Interactive    | 1 | 3  | 9  | Y | Y | N |
| Interactive    | 2 | 3  | 9  | Y | Y | N |
| Interactive    | 3 | 3  | 9  | Y | Y | N |
| Background     |   | 1  | 10 | Y | Y | N |
| Background     |   | 2  | 11 | Y | Y | N |
| Background     |   | 3  | 12 | N | Y | N |

The priority levels as just defined will be used by the resource management algorithms in order to prioritise access to the resources when several RABs are in competition to obtain the same resources and, more particularly, by the algorithms implementing a pre-emption procedure, in order to be able to determine which RAB is going to pre-empt the resources of which other RAB when the resources needing to be allocated are insufficient or unavailable.

The pre-emption procedure can be used, in particular, at the access control step, i.e., when the RNC receives a new RAB request. A new RAB request may stem either from the establishment of a new RAB in the access network, or from a mobility procedure for an RAB already admitted into the access network.

In this case, with reference to the diagram of FIG. 3, when the load level of the system is in area 2 or 3, i.e., either available resources exist but they are insufficient to respond to the new request in such a way that the QoS requirements are met, or there are no more available resources, a pre-emption procedure is used by the resource management algorithms in order to recover the required resources according to the priority level of the entering RAB and the priority level of the RABs that are active in the system.

The pre-emption procedure is likewise provided to be used during the call for traffic control, in response to the change in the traffic of an RAB already active within the network, resulting in a request for additional resources, when the resources in the network for satisfying this request are unavailable or insufficient. This then involves an individual control operation. The pre-emption procedure makes it possible to reduce the resources allocated to an RAB that has a lower priority level and to re-allocate these resources released to the RAB that requests them and that has a higher priority level.

In the case where the load level of the network is in area 1 and where there is therefore no restriction on the resources, said network must nevertheless be capable of reacting to the variations in throughput of an already active RAB, with the result being that the resources allocated to the user may be dynamically adjusted as needed. Thus, in the case where two or more users simultaneously request additional resources, the resource management algorithms prioritise the allocation of the resources based on the priority levels associated with each RAB, so that the RAB that has the highest priority level is served on a priority basis.

Conversely, when there is no restriction on resources in the network and if two or more users do not use the resources that have been allocated to them in an optimal manner, the priority levels associated with each RAB concerned will be used within the framework of traffic control, so as to reduce the resources allocated. In this case, the RABs that have a lower priority level will have their resources reduced first, then those that have a higher priority and finally those that have the highest priority amongst the RABs concerned.

Likewise, in areas 2 and 3, similarly to area 1, if several users do not make optimal use of their resources, the priority levels associated with each RAB concerned will be used within the framework of traffic control, so as to reduce the resources allocated. In this case, the order in which the allocated resources are reduced is defined by the priority level for each RAB concerned, as defined according to the invention.

Finally, the pre-emption procedure can also be implemented during the call, in response to the change in the load in the system, within the framework of global traffic control. In particular, when the load level of the network is in area 3, it is necessary to bring the resource use levels back to more stable values. In this case, the pre-emption procedure implemented within the framework of traffic control aims to reduce the load levels in the system. To accomplish this, the pre-emption procedure establishes an order amongst the active RABs whose allocated resources are capable of being reduced, by using the priority levels associated with each of these RABs. Those that have the lowest priority will have their resources reduced first, followed by those that have more priority, ending finally, if the load in the network has not returned to an acceptable level, with those that have the highest priority level.

GLOSSARY

This glossary presents the list of the English acronyms used in this patent application. These acronyms are defined within the framework of the 3GPP Telecommunications Standard.

| | |
|---|---|
| 3GPP | Third-Generation Partnership Project (of ETSI) |
| ETSI | European Telecommunications Standards Institute |
| GSM | Global System for Mobile Communication |
| UMTS | Universal Mobile Telecommunication System |
| IP | Internet Protocol |
| BTS | Base Transceiver Station |
| BSC | Base Station Controller |
| HLR | Home Location Register |
| SGSN | Serving GPRS Support Node |
| GGSN | Gateway GPRS Support Node |
| UTRAN | UMTS Terrestrial Radio Access Network |
| RNC | Radio Network Controller |
| QoS | Quality of Service |
| ARP | Allocation Retention Priority |
| PDP | Packet Data Protocol |
| THP | Traffic Handling Priority |
| IMSI | International Mobile Subscriber Identity |
| RAB | Radio Access Bearer |

The invention claimed is:

1. A method for managing radio resources in a universal mobile telecommunication system (UMTS) mobile communications network comprising a core network and a radio access network for supporting a plurality of service requests sent by user equipment to the core network, each service being specified by parameters of the core network describing a quality of service required for a requested service, said quality of service parameters of the core network including at least an Allocation/Retention Priority quality of service parameter and a quality of service parameter representative of a traffic class associated to the requested service, said method comprising:
    mapping, by a service node of the core network, said quality of service parameters of the core network with quality of service parameters of the radio access network, said quality of service parameters of the radio access network including the Allocation/Retention Priority quality of service parameter having a priority level sub-parameter, and said mapping determining a value of said priority level sub-parameter based on a value of the Allocation/Retention Priority quality of service parameter of the core network and a value of said quality of service parameter representative of the traffic class associated to the requested service;
    sending, by the service node of the network core to the radio access network, a radio access bearer service request comprising said quality of service parameters of the radio access network;
    defining a priority level for the requested service in the radio access network by the value of the priority level sub-parameter of the Allocation/Retention Priority quality of service parameter of the radio access network; and
    prioritizing allocation of radio resources to determine, on a priority basis, which of a plurality of radio bearer services will be allocated the additional radio resources based on a priority level associated with each of the plurality of radio access bearer services when a plurality of radio access bearer services already active within the network are a subject, respectively, of a request for additional radio resources and when radio resources required to satisfy requests for additional radio resources are available;
    wherein, when the plurality of radio access bearer services already active within the UMTS mobile communication network do not utilize allocated radio resources in an optimal manner, said step of prioritizing further comprises reducing radio resources allocated to the plurality of radio access bearer services already active within the UMTS mobile communication network that do not utilize the allocated radio resources in an optimal manner, in an order defined by the priority level associated with each of the plurality of radio access bearer services.

2. The method of claim 1, wherein said at least one quality of service parameter of the radio access network associated with the type of service includes a "Traffic Class" parameter.

3. The method of claim 2, wherein said at least one quality of service parameter of the radio access network associated with the type of service further includes a Traffic Handling Priority parameter to prioritize interactive-type services in relation to each other.

4. The method of claim 1, further comprising:
    pre-empting resources at the access network level; when at least one new radio access bearer request is received by the radio access network, and when one of no additional resources are available and if radio resources required to satisfy the quality of service required by the requested service are insufficient.

5. The method of claim 1, further comprising:
    pre-empting resources at a radio access network level when at least one request for additional radio resources is received to respond to a change in traffic on said UMTS mobile communications network, and when one of no additional radio resources are available and if radio resources required to satisfy the quality of service required by the requested service are insufficient.

6. A core network service node of a universal mobile telecommunication system (UMTS) mobile communications network comprising a core network and a radio access network, the core network service node being configured to receive a plurality of service requests sent by user equipment to the core network, each service being specified by parameters of the core network describing a quality of service required for a requested service, said quality of service parameters of the core network including at least an Allocation/Retention Priority quality of service parameter and a quality of service parameter representative of a traffic class associated to the requested service, said service node comprising:
    means for mapping, by a service node of the core network, said quality of service parameters of the core network with quality of service parameters of the radio access network, said quality of service parameters of the radio access network including the Allocation/Retention Priority quality of service parameter having a priority level sub-parameter, and said mapping determining a value of said priority level sub-parameter based on a value of the Allocation/Retention Priority quality of service parameter of the core network and a value of said quality of service parameter representative of the traffic class associated to the requested service;
    means for sending, by the service node of the network core, to the radio access network a radio access bearer service request comprising said quality of service parameters of the radio access network;
    means for defining a priority level for the requested service in the radio access network by the value of the priority level sub-parameter of the Allocation/Retention Priority quality of service parameter of the radio access network; and
    means for prioritizing allocation of radio resources to determine, on a priority basis, which of a plurality of radio bearer services will be allocated the additional radio resources based on a priority level associated with each of the plurality of radio access bearer services when a plurality of radio access bearer services already active within the network are a subject, respectively, of a request for additional radio resources and when radio resources required to satisfy requests for additional radio resources are available;

wherein, when the plurality of radio access bearer services already active within the UMTS mobile communication network do not utilize allocated radio resources in an optimal manner, said means for prioritizing further comprises means for reducing radio resources allocated to the plurality of radio access bearer services already active within the UMTS mobile communication network that do not utilize the allocated radio resources in an optimal manner, in an order defined by the priority level associated with each of the plurality of radio access bearer services.

7. A radio access network controller (RNC) of a universal mobile telecommunication system (UMTS) mobile communications network comprising a core network and a radio access network, the RNC being configured to receive a plurality of radio access bearer requests sent by the core network in response to a plurality of service requests by users, quality of service parameters of the core network including at least an Allocation/Retention Priority quality of service parameter and a quality of service parameter representative of a traffic class associated to the requested radio access bearer, and quality of service parameters of the radio access network including the Allocation/Retention Priority quality of service parameter having a priority level sub-parameter, and a value of said priority level sub-parameter being mapped and based on a value of the Allocation/Retention Priority quality of service parameter of the core network and a value of said quality of service parameter representative of the traffic class associated to the requested service, said RNC controller comprising:

means for pre-empting radio bearer service resources based on a priority level associated with each radio access bearer service;

means for defining a priority level of each radio access bearer service by the value of the priority level sub-parameter of the Allocation/Retention Priority quality of service parameter of the radio access network; and means for prioritizing allocation of radio resources to determine, on a priority basis, which of a plurality of radio bearer services will be allocated the additional radio resources based on a priority level associated with each of the plurality of radio access bearer services when a plurality of radio access bearer services already active within the network are a subject, respectively, of a request for additional radio resources and when radio resources required to satisfy requests for additional radio resources are available;

wherein, when the plurality of radio access bearer services already active within the UMTS mobile communication network do not utilize allocated radio resources in an optimal manner, said means for prioritizing further comprises means for reducing radio resources allocated to the plurality of radio access bearer services already active within the UMTS mobile communication network that do not utilize the allocated radio resources in an optimal manner, in an order defined by the priority level associated with each of the plurality of radio access bearer services.

8. The access network controller (RNC) of claim 7, wherein the means for pre-empting radio bearer service resources are implemented when at least one new radio access bearer service request is received, and when one of no additional radio resources are available and if radio resources required to satisfy the quality of service required by a requested service of the plurality of service requests are insufficient.

9. The radio access network controller (RNC) as claimed in claim 7, wherein the means for pre-empting resources are implemented when at least one request for additional resources is received to respond to a change in traffic on said UMTS mobile communications network, and when one of no additional radio resources are available and if radio resources required to satisfy the quality of service required by a requested service of the plurality of service requests are insufficient.

10. The radio access network controller (RNC) as claimed in claim 7, further comprising, when a plurality of radio access bearer services already active within the network are a subject, respectively, of a request for additional radio resources and when the resources required to satisfy said requests for additional radio resources are available, prioritization means for allocation of resources, configured to determine on a priority basis, which of the each radio bearer service will be allocated the additional radio resources based on a priority level associated with each of the plurality of radio bearer services.

11. The radio access network controller (RNC) as claimed in claim 7, further comprising, when a plurality of radio access bearer services already active within the network do not utilize allocated resources in an optimal manner, means for reducing resources allocated to each of the plurality of radio bearer services in an order defined by a priority level associated with each of said plurality of radio bearer services.

12. A method for managing radio resources in a universal mobile telecommunication system (UMTS) mobile communications network comprising a core network and a radio access network for supporting a plurality of service requests sent by user equipment to the core network, each service being specified by parameters of the core network describing a quality of service required for a requested service, said quality of service parameters of the core network including at least an Allocation/Retention Priority quality of service parameter and a quality of service parameter representative of a type of service associated to the requested service, said method comprising:

mapping, by a service node of the core network, said quality of service parameters of the core network with quality of service parameters of the radio access network, said quality of service parameters of the radio access network including the Allocation/Retention Priority quality of service parameter having a priority level sub-parameter, and said mapping determining a value of said priority level sub-parameter based on a value of the Allocation/Retention Priority quality of service parameter of the core network and a value of said quality of service parameter representative of the type of service associated to the requested service;

sending, by the service node of the network core to the radio access network, a radio access bearer service request comprising said quality of service parameters of the radio access network;

defining a priority level for the requested service in the radio access network by the value of the priority level sub-parameter of the Allocation/Retention Priority quality of service parameter of the radio access network;

prioritizing allocation of radio resources to determine, on a priority basis, which of the plurality of radio bearer services will be allocated the additional radio resources based on a priority level associated with each of the plurality of radio access bearer services when a plurality of radio access bearer services already active within the network are a subject, respectively, of a request for additional radio resources and when radio resources required to satisfy requests for additional radio resources are available;

wherein, when the plurality of radio access bearer services already active within the UMTS mobile communication network do not utilize allocated radio resources in an optimal manner, said step of prioritizing further comprises reducing radio resources allocated to the plurality of radio access bearer services already active within the UMTS mobile communication network that do not utilize the allocated radio resources in an optimal manner, in an order defined by the priority level associated with each of the plurality of radio access bearer services.

* * * * *